UNITED STATES PATENT OFFICE.

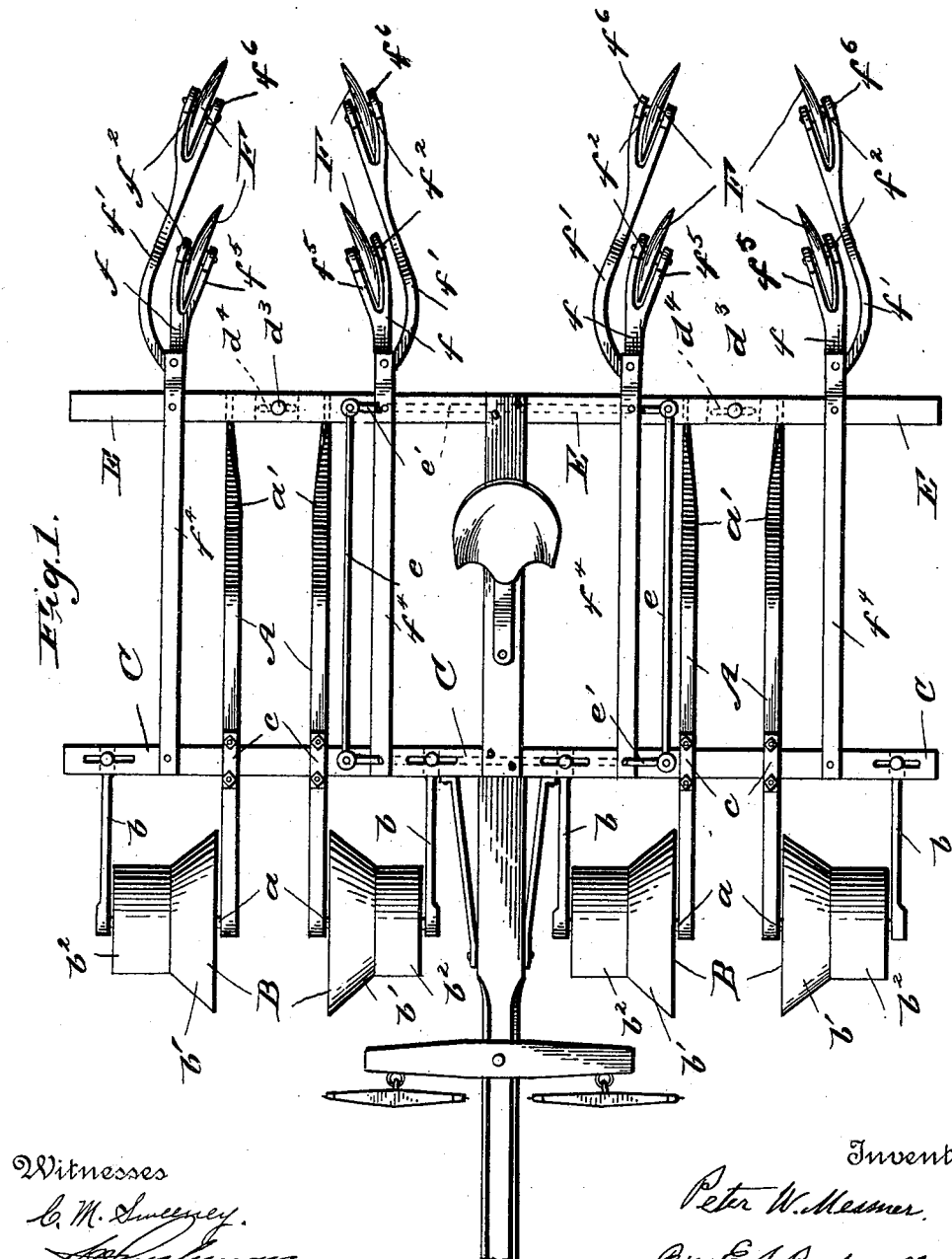

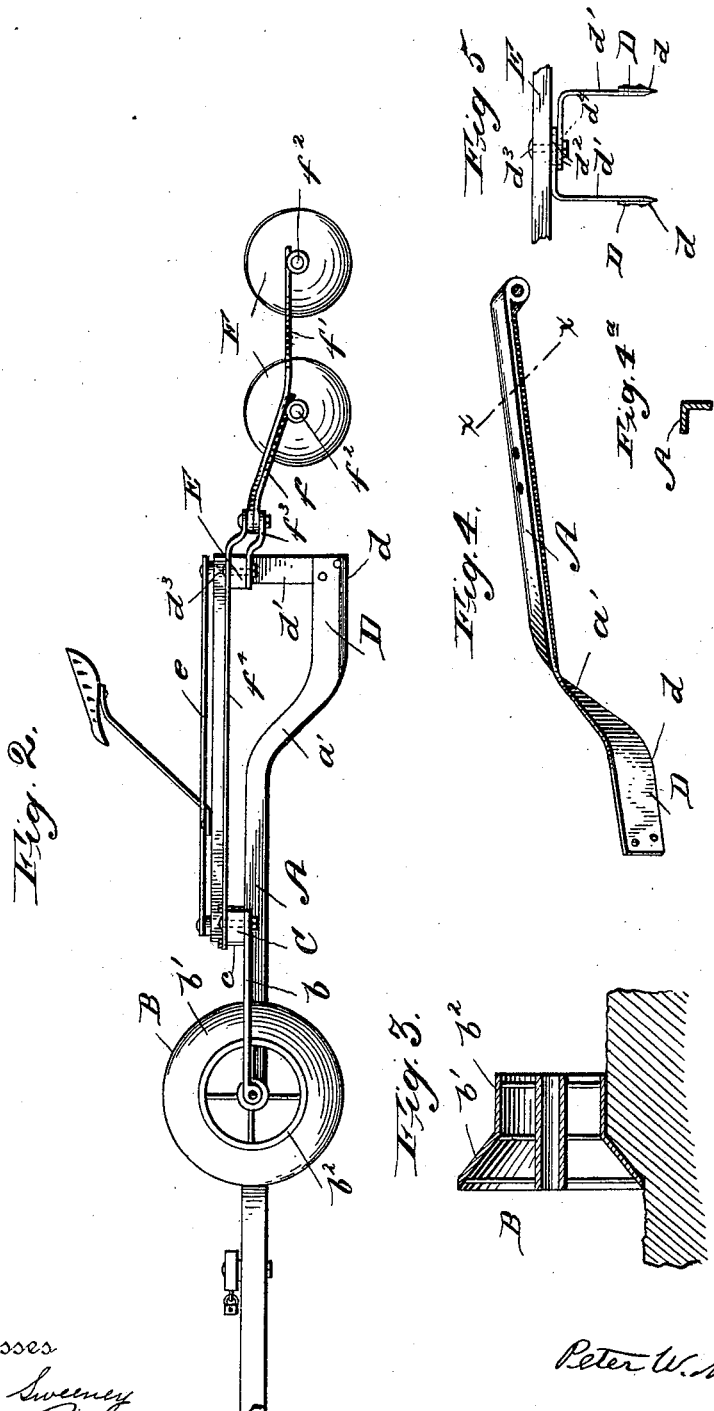

PETER W. MESMER, OF VERMILION, KANSAS.

CULTIVATOR.

SPECIFICATION forming part of Letters Patent No. 621,580, dated March 21, 1899.

Application filed March 31, 1898. Serial No. 675,841. (No model.)

*To all whom it may concern:*

Be it known that I, PETER W. MESMER, a citizen of the United States, residing at Vermilion, in the county of Marshall and State of Kansas, have invented certain new and useful Improvements in Cultivators, of which the following is a specification, reference being had to the accompanying drawings.

My invention relates to cultivators, and particularly to cultivators for listed corn; and it consists in the improved construction and novel features which I have illustrated in the drawings which accompany and form a part of this specification and to which I shall refer by letter in the detailed description of the structural features of my improved cultivator which follows.

In the drawings, Figure 1 is a plan view of my improved cultivator. Fig. 2 is a view in side elevation of the cultivator. Fig. 3 is a detail view showing one of the pulverizing and supporting rollers. Fig. 4 is a detail view of the supporting-beam to show its novel construction. Fig. $4^a$ is a section on line $x\,x$ of Fig. 4. Fig. 5 is a detail view of the vertical posts which support the rear end of the plow-beams and their adjustable hangers.

In the various figures the same letters denote like parts of the structure.

The cultivator as I have shown it is intended to work on two rows of corn at a time; but it will be readily seen that its capacity may be increased by increasing the number of rollers and disk-supporting frames without departing from the spirit of my invention. It will be noticed that the two frames shown side by side in the drawings are duplicates of each other in the matter of detailed construction, and I shall therefore describe but one in detail.

The main frame of my improved cultivator consists of the longitudinally-disposed parallel beams A, preferably formed of L-shaped angle-iron to give the proper rigidity to the frame and yet be light. At the forward end of each of said beams is formed a bearing for the inner end of the shafts $a$, on which are mounted the supporting and pulverizing rollers B, which uphold the forward end of the cultivator-frame, the outer ends of the said shafts $a$ having bearings in adjustable hanger-arms $b$, extending from a cross-beam C, to which the beams A are adjustably secured. Said rollers B are, as shown in Fig. 3, conoidal in shape for a portion of their lengths at their inner ends $b'$, while at their outer ends $b^2$ they are cylindrical. The action of the roller formed in this manner is, I find, better than where it has only the conoidal shape, as the cylindrical portion gives a good support for the cultivator in deep soft soil and prevents the conoidal portion cutting too deeply. This, it is apparent, insures an even cutting depth being taken on either side of the row of corn by the rollers B and a lurching or irregular action of the cultivator by reason of one roller cutting deeper than the other and allowing the cultivator to sag on that side is avoided. This construction of roller also secures a uniform action of the plow or cutter portions and disk-wheels, which form a part of the cultivator and which will be referred to hereinafter, and prevents all danger of their being thrown out of line by the irregular action of the rollers and injuring the young corn.

The cross-beam C, hereinbefore referred to, rests upon the beams A at a point just behind the rollers B, as best shown in Fig. 1, and the said beams A are secured to cross-beam C by means of the clips $c$, so as that the beams A and rollers B can be adjusted toward and from one another to accommodate rows of varying width. The rear ends $a'$ of beams A are curved or bent downwardly, so as to form plows or cutters D, the L-shaped angle-iron of which the beams A are formed being flattened at this point, so as to form a vertical cutter $d$, which cuts the soil after it has been pulverized by the rollers B and severs the weeds or grass which has been rolled down by the said rollers. In order that these cutters or plows D may be held rigidly, I provide the vertical posts $d'$, which are riveted to the vertical cutting portions $d$ and rise to a second cross-beam E, to which they are connected at their upper ends by a horizontal portion $d^2$. Said posts $d$ are adjustably secured to the cross-beam E by means of bolts $d^3$ passing through the portions $d^2$ and slots $d^4$, so as to allow adjustment of the beams A laterally, as described hereinbefore. The cross-beams C and E preferably extend the whole width of the cultivator, as shown in Fig. 1, and they are further strengthened and braced by means of the longitudinally-disposed rods $e$ and the transversely-placed rods $e'$, which form a rectangular stiffening-frame.

Behind the cutters D are mounted the soil gathering or cutting disks F, preferably two on each side, as shown. Said disks F are placed zigzag and are carried by rearwardly-extending arms $f f'$, which support the shafts $f^2$, on which disks F are mounted. The forward ends of these arms $f f'$ are adjustably secured to hangers $f^3$ on the cross-beam E, and a draft-strap $f^4$ extends from the forward cross-beam C, so as to relieve the beam E and the vertical posts $d'$ from the entire strain of the disks F. The said arms $f f'$ are forked, as shown, and between the forked ends $f^5 f^6$ the shafts $f^2$ of the disks F are mounted in suitable bearings. Both the arms $f^5 f^6$ are, as shown, held by a single bolt $f^7$, which passes through the forward ends of said arms and the hanger $f^3$ and draft-strap $f^4$, and each arm, with its disk, is thus made adjustable independently of its fellow, so as that not only can the arms be adjusted relative to the main frame and the pair of disks carried on the other side of the row, but also with respect to each other.

Having thus described my invention, I claim and desire to secure by Letters Patent—

1. In a cultivator, the combination with a series of supporting-rollers, of a series of longitudinally-disposed beams supported at their forward ends by said rollers, the rear ends of said beams being downwardly bent so as to support the rear portion of the cultivator and form cutters, as and for the purposes set forth.

2. In a cultivator, the combination with a series of supporting-rollers, having conoidal and cylindrical portions, of a series of longitudinally-disposed beams supported at their forward ends by said rollers, the rear ends of said beams being bent downwardly so as to support the rear portions of the cultivator and form cutters.

3. In a cultivator, the combination with a series of supporting-rollers having conoidal and cylindrical portions, of a series of longitudinally-disposed beams supported at their forward ends by said rollers, the rear ends of said beams being bent downwardly so as to support the rear portion of the cultivator and form cutters, said beams and rollers being adjustable toward and from one another.

4. In a cultivator, the combination with a series of supporting and pulverizing rollers, of longitudinally-disposed beams supported at their forward ends by said rollers, the rear ends of said beams bending downwardly to support the rear of the cultivator and form cutters, and transverse beams to which said longitudinal beams are secured so as to permit adjustment of said longitudinal beams and rollers.

5. In a cultivator, the combination with a series of supporting and pulverizing rollers, of longitudinally-disposed beams supported at their forward ends by said rollers, the rear ends of said beams bending downwardly to support the rear of the cultivator and form cutters, transverse beams to which said longitudinal beams are secured so as to permit adjustment of said longitudinal beams and rollers, and a series of gathering or cutting disks mounted on the cultivator-frame and having an independent adjustment relative to said longitudinal beams.

6. In a cultivator, the combination with a series of supporting-rollers having cylindrical and conoidal portions, of longitudinally-disposed beams supported on said rollers and adjustable toward and from each other, said beams being formed of L-shaped angle-iron and being flattened and bent downwardly at their rear ends to form cutters.

7. In a cultivator, the combination with a series of supporting and pulverizing rollers having conoidally-shaped inner ends and cylindrical outer portions, of longitudinally-disposed beams formed of angle-iron supported by said rollers, a cross-beam to which said longitudinal beams are adjustably secured, the rear ends of said beams being bent downwardly and flattened to form cutters, vertical posts rising from said flattened portions, a second cross-beam to which said posts are adjustably secured, a hanger carried by said second cross-beam, a series of gathering or cutting disks pivoted to said hanger and having an independent adjustment relative thereto, and a draft-strap running from said first-mentioned cross-beam to the said gathering-disks.

8. In a cultivator, the combination with a series of supporting and pulverizing rollers having conoidally-shaped inner ends and cylindrical outer portions, of longitudinally-disposed beams formed of angle-iron, supported by said rollers, a cross-beam to which said longitudinal beams are adjustably secured, the rear ends of said beams being bent downwardly and flattened to form cutters, vertical posts rising from said flattened portions, a second cross-beam to which said posts are adjustably secured, a hanger carried by said second cross-beam, gathering or cutting disks pivoted to said hanger and adjustable relative to said hanger and to each other.

9. In a cultivator, the combination with a series of supporting and pulverizing rollers having conoidally-shaped inner ends and cylindrical outer portions, of longitudinally-disposed beams formed of angle-iron, supported by said rollers, a cross-beam to which said longitudinal beams are adjustably secured, the rear ends of said beams being bent downwardly and flattened to form cutters, vertical posts rising from said flattened portions, a second cross-beam to which said posts are adjustably secured, a hanger carried by said second cross-beam, gathering or cutting disks mounted in bearings on independent draft-arms, said arms being secured to said hanger so as to provide an adjustment for said cutting-disks relative to the main frame and to each other.

In testimony whereof I affix my signature in the presence of two witnesses.

PETER W. MESMER.

Witnesses:
  DAVID C. DILLE,
  CHARLES A. BILSLAND.